United States Patent
Flügge et al.

(10) Patent No.: US 9,833,863 B2
(45) Date of Patent: Dec. 5, 2017

(54) WELDING ADDITIVE FOR ELECTRIC ARC WELDING AND LASER BEAM WELDING OF MIXED JOINS MADE OF AUSTENITIC AND FERRITIC STEEL

(71) Applicant: Salzgitter Flachstahl GmbH, Salzgitter (DE)

(72) Inventors: Wilko Flügge, Cramme (DE); Matthias Höfemann, Hannover (DE); Bianca Springub, Hannover (DE); Zacharias Georgeou, Wolfsburg (DE)

(73) Assignee: Salzgitter Flachstahl GmbH, Salgitter (DE)

( * ) Notice: Subject to any disclaimer, the term of this patent is extended or adjusted under 35 U.S.C. 154(b) by 438 days.

(21) Appl. No.: 14/364,557

(22) PCT Filed: Nov. 15, 2012

(86) PCT No.: PCT/DE2012/001133
§ 371 (c)(1),
(2) Date: Jun. 11, 2014

(87) PCT Pub. No.: WO2013/087049
PCT Pub. Date: Jun. 20, 2013

(65) Prior Publication Data
US 2014/0299590 A1    Oct. 9, 2014

(30) Foreign Application Priority Data

Dec. 12, 2011   (DE) .................. 10 2011 121 705

(51) Int. Cl.
*B23K 35/30* (2006.01)
*B22D 11/06* (2006.01)
(Continued)

(52) U.S. Cl.
CPC ...... *B23K 35/3073* (2013.01); *B22D 11/0631* (2013.01); *B23K 9/0026* (2013.01);
(Continued)

(58) Field of Classification Search
CPC .............. B23K 35/3073; B23K 9/0026; B23K 2201/34; B23K 35/3053; B23K 35/0255; B22D 11/0631; C21D 8/0215
See application file for complete search history.

(56) References Cited

U.S. PATENT DOCUMENTS 3,645,782 A * 2/1972 Johnson ............. B23K 35/3066
148/26
2006/0179638 A1   8/2006 Engl et al.
(Continued)

FOREIGN PATENT DOCUMENTS

DE        924 601      3/1955
DE     199 00 199      7/2000
(Continued)

OTHER PUBLICATIONS

International Search Report issued by the European Patent Office in International Application PCT/DE2012/001133 dated Feb. 20, 2013.

*Primary Examiner* — Christopher Kim
(74) *Attorney, Agent, or Firm* — Henry M. Feiereisen LLC

(57) ABSTRACT

A welding additive for electric arc welding and laser beam welding of mixed joins composed of austenitic and high-manganese-containing and ferritic steel, where the high-manganese-containing steel has a manganese content of at least 7-30% by weight includes the following alloy elements in % by weight: C 0.04-1.0; Mn 7-30; Si≤6; Al≤4; Mo≤2; Ti≤0.5; Zr 0.01-01; B 0.001-0.01; P<0.005; S<0.002; N<0.008; balance iron and unavoidable steel accompanying elements.

7 Claims, 2 Drawing Sheets

(51) Int. Cl.
  *B23K 9/00*  (2006.01)
  *B23K 35/02*  (2006.01)
  *C21D 8/02*  (2006.01)
  *B23K 101/34*  (2006.01)

(52) U.S. Cl.
  CPC ...... *B23K 35/0255* (2013.01); *B23K 35/3053* (2013.01); *B23K 2201/34* (2013.01); *C21D 8/0215* (2013.01)

(56) References Cited

U.S. PATENT DOCUMENTS

2012/0121452 A1  5/2012  Spitzer et al.
2013/0048150 A1  2/2013  John et al.

FOREIGN PATENT DOCUMENTS

| | | |
|---|---|---|
| DE | 102 59 230 | 7/2004 |
| DE | 102004061284 | 7/2005 |
| DE | 102006059884 | 6/2008 |
| DE | 102009007470 | 8/2010 |
| JP | 56-059597 | 5/1981 |
| JP | 2003-220492 | 8/2003 |
| WO | WO 95/26423 | 10/1995 |

\* cited by examiner

| | | C [%] | Mn [%] | Si [%] | Al [%] | Mo [%] | Zr [%] | B [%] |
|---|---|---|---|---|---|---|---|---|
| Filler wire | 1 HSD® belt | 0,7 | 15 | 2,5 | 2,5 | --- | --- | --- |
| Filler wire | 2 Starting alloy | 0,2 | 24 | --- | --- | 0,1 | --- | --- |
| Filler wire | 3 Iteration 1 | 0,2 | 18 | --- | --- | 0,1 | --- | --- |
| Filler wire | 4 Iteration 2 | 0,1 | 20 | --- | --- | 0,1 | --- | --- |
| Filler wire | 5 Iteration 3 | 0,2 | 18 | --- | 0,1 | 0,5 | 0,02 | 0,006 |
Table 1: welding additives
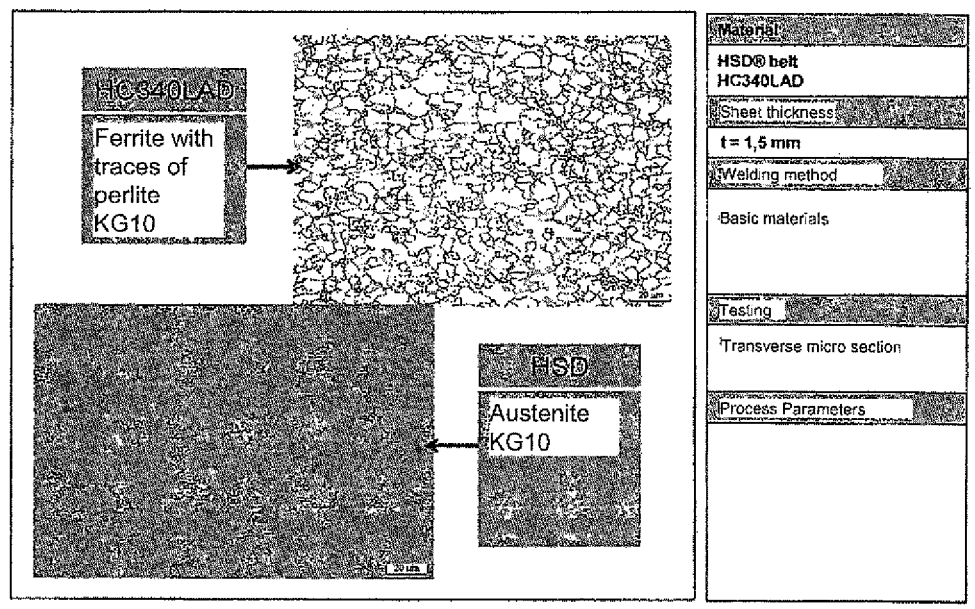
FIG 1: Basic Materials

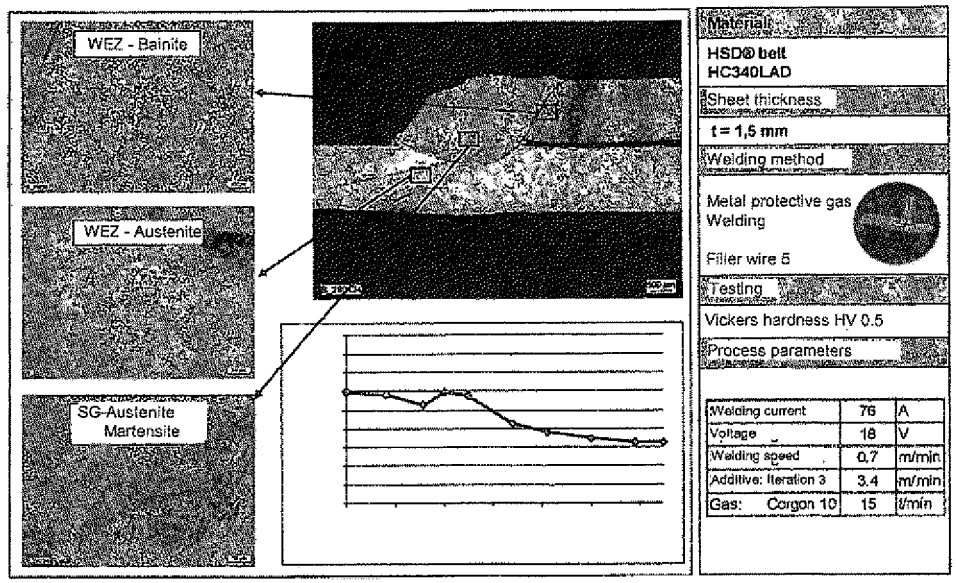
FIG. 2: Transverse hardness of a hollow seam with filler wire 5 (HSD® bottom, HC340LAD top
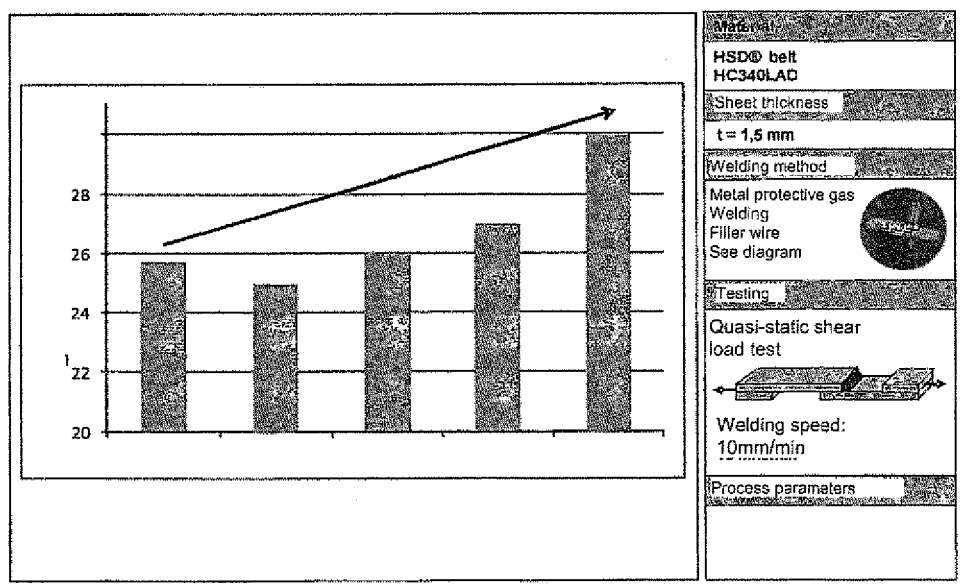
FIG. 3: Maximal shear load force

WELDING ADDITIVE FOR ELECTRIC ARC WELDING AND LASER BEAM WELDING OF MIXED JOINS MADE OF AUSTENITIC AND FERRITIC STEEL

CROSS-REFERENCES TO RELATED APPLICATIONS

This application is the U.S. National Stage of International Application No. PCT/DE2012/001133, filed Nov. 15, 2012, which designated the United States and has been published as International Publication No. WO 2013/087049 A1 and which claims the priority of German Patent Application, Serial No. 10 2011 121 705.7, filed Dec. 12, 2011, pursuant to 35 U.S.C. 119(a)-(d).

BACKGROUND OF THE INVENTION

The invention relates to a welding additive for electric arc welding and laser beam welding of mixed joins made of austenitic and ferritic steel.

In the following, the term electric arc welding includes all benefits which a welding additive is used for producing welding joints as for example metal protective gas welding (MSG), tungsten inert gas and plasma gas welding, as well as hybrid welding methods, a combination of metal protective gas welding and laser beam welding.

In the following, austenitic steel relates in particular to a high manganese steel with up to 30% weight percent manganese, as it is for example known from DE 102 59 230 A1, DE 199 00 199 A1 or DE 10 2004 061 284 A1.

Beside iron and manganese as main elements these steels contain carbon and other elements such as for example aluminum and silicone. The flat products produced from these steels have a high-strength and a high uniform elongation.

Due to their advantageous properties steels with high manganese contents are suitable for construction of transport vehicles, in particular for automobile construction and here in particular for vehicle-body and chassis components. However, other areas use such as for example machine construction or construction are also conceivable.

Oftentimes welding joints between the high-manganese-content austenitic steel and a ferritic steel have to be produced by means of electric arc welding and/or laser beam welding for so-called tailor welded blanks with which crash and weight optimized components can be produced.

While the electric arc welding of same-type high-manganese-content steels is for example known from DE 10 2009 007470 A1 and represents state-of-the-art, for electric arc welding or laser beam welding on mixed joints only additives based on CrNi from the classical black/white-mixed joints, i.e., joints from austenitic Cr—Ni Steels and ferritic steels are known to date.

It is a disadvantage that chromium leads to chromium carbides in the welding zone, so that carbon is no longer available in sufficient amounts as alloy element to form austenite in the high-manganese-content steels. The element Nickel generally leads to the fact that the weld metal has a high tenacity but an insufficient strength.

Because the properties of the welding joint with the known additives on CrNi basis are not compatible with the properties of the used basic materials, the welding additive according to the invention omits these two elements.

Further, coarse, adjacently arranged austenitic and martensitic microstructure phases form during welding of the above mentioned mixed joints which microstructure phases in such a constellation have insufficient mechanical characteristic values. In order to improve the mechanical properties it is a further goal to adjust the alloy composition of the welding additive so that these two phases, which in this case always form, are present in a fine grained and finely distributed manner.

SUMMARY OF THE INVENTION

The invention is therefore based on the object to set forth a welding additive to electric arc welding and/or laser beam welding of mixed joints from austenitic high-manganese-content steel and ferritic steel which achieves a weld metal during welding having the desired mechanical properties and fine-grained distributed microstructure phases without the elements chromium and nickel.

According to the teaching of the invention, this object is solved by a welding additive with the following alloy composition in weight percent:

C 0.04-1.0
Mn 7-30
Si≤6
Al≤4
Mo≤2
Ti≤0.5
Zr 0.01-0.1
B 0.002-0.01
P<0.005
S<0.002
N<0.008 remainder iron and unavoidable steel accompanying elements.

Compared to the known CrNi based filler wire, the welding additive according to the invention has the great advantage that the latter is on one hand significantly more cost effective due to the omission of chromium and nickel and that the properties of the welding joints produced therewith are optimally adjusted to the demands placed on the mixed joints made from high-manganese-content austenitic and ferritic steel.

In particular addition of zirconium and boron an optimal microstructure phase distribution and fine graininess is achieved with regard to the mechanical properties of the weld metal.

In the weld metal of such a joint on one hand a homogenous transition between ferritic and also martensitic microstructure regions from the ferritic side is achieved by means of the welding additive according to the invention, and on the other hand a fine graininess which cause a significant improvement of the mechanical properties of the weld metal.

The concrete alloy composition of the additive, in particular with regard to the addition of C and Mn, is essentially adjusted to the composition of the austenitic joining partner, wherein the addition of Zr and B is also important corresponding to the advantageous alloy compositions which are mentioned in claims 2 and 3 with regard to costs and the properties of the weld metal, in order to achieve the required mechanical properties of the welding joint.

The elements Al, Si, Mo, and Ti are not strictly required, however, they are oftentimes unavoidable as accompanying elements and they should be kept in the provided limits in order to not adversely influence production costs and the properties of the weld metal. Addition of Ti and Mo in the provided limits can also have a positive effect on the microstructure properties of the weld metal because in the case of addition of small amounts of Zr and B the desired fine graininess of the microstructure phases in the weld metal is achieved.

The disclosed welding additive in wire form is particularly well suited for all possible electric arc welding methods such as for example metal protective gas welding (MSG), tungsten inert gas and plasma welding as well as for laser beam welding and laser metal protective gas hybrid welding, in which the welding joint is generated with filler wire.

Advantageously, the welding additive according to the invention is also suited for producing welding joints at uncoated or metallically coated materials. The metallic coatings can be produced on the basis of zink and/or aluminum and/or silicone and/or magnesium.

With the filler wire according to the invention seam shapes in butt welded joints for example for strip joint welding and for producing tailored blanks can be produced with high quality, i.e., in a quality that matches the requirement. Further, weldings on components can be realized at the lap joint as hollow weld and also I-seam without problems.

Based on the high-manganese-content basic material disclosed in DE 10 2004 0161 284, filler wires with different alloy compositions were initially developed and tested.

Tests have shown that for achieving mechanical properties that meet the requirements by establishing a fine distribution of adjacently arranged microstructure phases of austenite and ferrite, addition of zirconium and boron are required.

BRIEF DESCRIPTION OF THE DRAWING

FIG. 1 shows the materials used in various tests along with their microstructures;

FIG. 2 shows a transverse micro-section of a hollow seam welding using the filler wire according to the invention.

FIG. 3 shows the achieved maximal force in a quasi static sheer load test performed on probes produced with different filler wires.

DETAILED DESCRIPTION OF PREFERRED EMBODIMENTS

A primary goal of the present invention is to produce mixed joints of high-manganese-content austenitic steel with a conventional steel so that the properties of the joint match those of the used basic materials.

For this purpose, tests were performed with the goal to adjust in the weld metal of such a joint a homogenous transition between ferritic and also martensitic microstructure regions from the ferritic side toward the austenitic microstructure regions of the austenitic side, wherein the microstructures were to be as fine grained as possible.

The tests were performed with an un-galvanized HSDR steel in a sheet thickness of t=1.50 mm and with a hot galvanized micro-alloyed fine grained steel of the grade H340LAD also with a sheet thickness of t=1.50.

The basic materials had the following chemical composition in weight percent:

|  | HSD ® (Austenite) | H340LAD (Ferrite) |
|---|---|---|
| C | 0.7 | 0.064 |
| Mn | 15 | 0.652 |
| Si | 2.5 | 0.01 |
| Al | 2.5 | 0.038 |

|  | HSD ® (Austenite) | H340LAD (Ferrite) |
|---|---|---|
| Mo | — | 0.003 |
| Ti | — | 0.0085 |
| Nb | — | 0.0477 |
| V | — | 0.003 |
| P | <0.005 | 0.01 |
| S | <0.02 | 0.004 |
| N | <0.008 | 0.0041 |

For the tests, metal protective gas welding was used, wherein the following process parameters have proven advantageous in pre-tests:

| Welding stream | 76-115 A |
|---|---|
| Voltage | 17.5-19 V |
| Welding speed | 0.7-1 m/min |
| Wire feed rate | 0.7-1.2 m/min |
| Gas | Corgon 10 (15 l/min) |
| Burner angle β | 60° |
| Burner angle α | 13° |
| Free wire length | 10 mm |

Based on the determined welding parameters, the different welding additives listed in table 1 were used. The alloy compositions of the tested filler wires 1-4 have in contrast to the additional wire 5 no added boron and zirconium. Within the scope of a suitability test, samples were produced for the metallographic analysis, for the quasi-static test and for the dynamic vibration test in the time strength range.

FIG. 1 shows the materials used for the tests with their microstructures. The photograph of the microstructure in the image on the bottom left shows the microstructure of the high strength high-manganese-content austenitic steel of the grade HSD® belt with a tensile strength of up to $R_m$-1000 MPa. An austenitic basic microstructure exists due to the high carbon and manganese content (grain size characteristic number 10).

As ferritic joint partner a micro-alloyed fine grained construction steel of the grade H340LA with a tensile strength of up to 550 MPa was used for which the basic microstructure is shown in the upper right hand side of the image. Finely distributed carbides and nitrides of the micro alloying elements Ti and Nb can be clearly seen.

The material HC340LAD is in the present case hot galvanized with a zink layer Z100. The presence of zink during welding of joints with HSD® was intentionally selected in order to test the welding of strip galvanized material in conjunction with the development of a welding filler wire. The austenitic basic material HSD® was used in the un-galvanized state.

FIG. 2 shows the transverse micro-section of a hollow seam welding with the filler wire 5 according to the invention. In the heat influence zone on the HSD® side, an austenitic microstructure is present.

In the HC340LAD a purely bainitic microstructure is present in the heat influence zone. In the weld metal is also very fine grained in comparison with the joints with the aforementioned alloy concepts, and austenitic and martensitic microstructure phases coexist homogenously distributed.

Expectedly, the hardness of the HSD® slightly decreases compared to the basic hardness of the HSD® of 300 HV0.5 in the heat influence zone. In the weld metal on the other hand similar hardness values are achieved as in the basic material of the HSD® steel.

In the heat influence zone on the side of the HC340LAD the hardness steadily decreases down to the basic hardness of the material. Also this course of hardness has a relatively steady basic material hardness decrease starting form the basic material hardness of the HSD® across the welding joint up to the basic material hardness of the HC340LAD.

FIG. 3 shows eh achieved maximal forces derived from a quasi static shear load test. In the samples produced with the addition wire 1 maximal forces of more than $F_{max}=25$ kN are achieved. Hereby the break occurs along the melting line of the seam on the upper sheet metal on the side of the HC340LAD. In the joints produced with the addition wire 2 slightly lower maximal forces are achieved compared to the joints produced with the HSD wire, wherein hereby also individual samples also failed in the unaffected basic material of the HC340LAD. In the joints which were produced with the addition wire 3 maximal forces of more than $F_{max}=25$ kN are measured again. The position of the break can in this case be observed in the non-affected basic material of the HC340LAD in all samples. In comparison thereto, in the joints with the addition wires 4 and 5 higher maximal forces are achieved (addition wire 4, $F_{max}=27$ kN, addition wire 5, $F_{max}=30$ kN) wherein the position of the breaks in most of the samples are along the melting line of he seam on the upper sheet metal of the HC340LAD.

The tests for verifying essentially include tests regarding the bearing properties under dynamic vibrating load on the standardized H-sample-shape. The Woehler diagram (force controlled) determined hereby of the metal protective gas welded mixed joints is at a high level. So called fatigued specimens without rupture at a withstood number of cycles of 2 Mio. load changes were achieved at a load horizon of 40 kN. The slope of the Woehler diagram at a k-value close to k=5 represents a value which reflects a high bearing property under dynamic vibrating load.

The test results show that with the alloy composition according to the invention of the welding additive, the required properties of the welding connection can be safely achieve.

The invention claimed is:

1. A welding additive for electric arc welding and laser beam welding of mixed joints made of austenitic high-manganese-content steel and ferritic steel having a strength opposing a break when at least maximal forces of more than 25 kN are applied, wherein the high-manganese-content steel has a manganese content of at least 7-30 weight percent, and wherein the welding additive does not include Chromium and Nickel, is configured as a solid wire and comprises the following alloy elements in weight percent:

| | |
|---|---|
| C | 0.04-1.0 |
| Mn | 7-30 |
| Si | ≤6 |
| Al | ≤4 |
| Mo | ≤2 |
| Ti | ≤0.5 |
| Zr | 0.01-0.1 |
| B | 0.001-0.01 |
| P | <0.005 |
| S | <0.002 |
| N | <0.008 | remainder iron and unavoidable steel accompanying elements.

2. The welding additive of claim 1, having the following composition in weight percent:

| | |
|---|---|
| C | 0.1-0.7 |
| Mn | 15-26 |
| Si | ≤2.5 |
| Al | ≤2.5 |
| Mo | ≤1 |
| Ti | ≤0.1 |
| Zr | 0.01-0.08 |
| B | 0.001-0.008 |
| P | <0.005 |
| S | <0.002 |
| N | <0.008 | remainder iron and unavoidable steel accompanying elements.

3. The welding additive of claim 2, having the following composition in weight percent:

| | |
|---|---|
| C | 0.1-0.3 |
| Mn | 18-20 |
| Si | ≤1 |
| Al | ≤0.5 |
| Mo | ≤1.0 |
| Ti | ≤0.1 |
| Zr | 0.01-0.04 |
| B | 0.004-0.006 |
| P | <0.005 |
| S | <0.002 |
| N | <0.008 | remainder iron and unavoidable steel accompanying elements.

4. The welding additive of claim 1, for producing welding joints on uncoated or coated materials.

5. The welding additive of claim 4, for use in conjunction with materials having a metallic coating.

6. The welding additive of claim 5, for use in conjunction with materials with a metallic coating in the basis of zinc and/or aluminum and/or silicone and/or magnesium.

7. A steel alloy for use as a solid welding filler wire for electric arc welding and laser beam welding of mixed joints from austenitic high-manganese-content steel and ferritic steel having a strength opposing a break when at least maximal forces of more than 25 kN are applied, wherein said steel alloy does not include Chromium and Nickel and is composed of the following alloy elements in weight %:

| | |
|---|---|
| C | 0.04-1.0 |
| Mn | 7-30 |
| Si | ≤6 |
| Al | ≤4 |
| Mo | ≤2 |
| Ti | ≤0.5 |
| P | <0.005 |
| S | <0.002 |
| N | <0.008, | remainder iron and unavoidable steel accompanying elements, with a combined addition of Zr at contents of 0.01-0.1 weight % and B at contents of 0.001-0.01 weight percent.

* * * * *